(12) United States Patent
Sigoure

(10) Patent No.: US 10,924,436 B2
(45) Date of Patent: *Feb. 16, 2021

(54) METHOD AND SYSTEM FOR MANAGING WORKLOADS IN A CLUSTER

(71) Applicant: Arista Networks, Inc., Santa Clara, CA (US)

(72) Inventor: Benoit Sigoure, San Francisco, CA (US)

(73) Assignee: Arista Networks, Inc., Santa Clara, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/883,668

(22) Filed: Jan. 30, 2018

(65) Prior Publication Data

US 2018/0176154 A1 Jun. 21, 2018

Related U.S. Application Data

(63) Continuation of application No. 14/043,358, filed on Oct. 1, 2013, now Pat. No. 9,917,797.

(51) Int. Cl.
| | | |
|---|---|---|
| *H04L 12/931* | (2013.01) | |
| *H04L 12/801* | (2013.01) | |
| *H04L 12/24* | (2006.01) | |
| *H04L 12/803* | (2013.01) | |
| *H04L 29/08* | (2006.01) | |

(52) U.S. Cl.
CPC .......... *H04L 49/50* (2013.01); *H04L 49/356* (2013.01); *H04L 41/08* (2013.01); *H04L 41/085* (2013.01); *H04L 47/11* (2013.01); *H04L 47/12* (2013.01); *H04L 47/125* (2013.01); *H04L 47/127* (2013.01); *H04L 67/1008* (2013.01)

(58) Field of Classification Search
CPC ....... H04L 41/08; H04L 41/085; H04L 47/11; H04L 47/12; H04L 47/125; H04L 47/127; H04L 49/356; H04L 49/50; H04L 67/1008; H04L 47/2458; H04L 41/0806; H04L 41/0833; G06F 3/0605; G06F 3/0656; G06F 11/2025

See application file for complete search history.

(56) References Cited

U.S. PATENT DOCUMENTS

| | | |
|---|---|---|
| 8,352,953 B2 | 1/2013 | Bozek et al. |
| 9,210,048 B1 | 12/2015 | Marr et al. |

(Continued)

OTHER PUBLICATIONS

Borthakur, D.; HDFS Architecture Guide; The Apache Software Foundation; 2008 (13 pages).

*Primary Examiner* — Jungwon Chang
(74) *Attorney, Agent, or Firm* — Chamberlain, Hrdlicka, White, Williams & Aughtry

(57) ABSTRACT

In general, embodiments of the invention relate to a switch that includes a processor, ports, and memory that includes instructions, which when executed by the processor perform a method. The method includes obtaining, via a port, a global task-server mapping from a first server, detecting that one of the ports is congested. The method further includes, based on the detecting, identifying a task associated with the one of the ports using the global-task server mapping, generating a task listing based on the identifying, generating an alert including the task listing, and transmitting the alert to an administrator.

20 Claims, 10 Drawing Sheets

(56) References Cited

U.S. PATENT DOCUMENTS

| | | | |
|---|---|---|---|
| 9,917,797 B2* | 3/2018 | Sigoure | H04L 49/50 |
| 2006/0031242 A1 | 2/2006 | Hall, Jr. et al. | |
| 2009/0172666 A1* | 7/2009 | Yahalom | G06F 3/0605 |
| | | | 718/1 |
| 2011/0016223 A1 | 1/2011 | Iannaccone et al. | |
| 2011/0161695 A1* | 6/2011 | Okita | G06F 1/3209 |
| | | | 713/310 |
| 2011/0238817 A1 | 9/2011 | Okita et al. | |
| 2012/0075999 A1 | 3/2012 | Ko et al. | |
| 2012/0163176 A1 | 6/2012 | Matsuoka | |
| 2012/0226789 A1* | 9/2012 | Ganesan | G06F 9/5061 |
| | | | 709/223 |
| 2012/0226799 A1* | 9/2012 | Kapur | H04W 4/50 |
| | | | 709/224 |
| 2013/0007505 A1* | 1/2013 | Spear | G06F 11/2025 |
| | | | 714/4.11 |
| 2013/0219063 A1* | 8/2013 | Frank | H04L 47/2458 |
| | | | 709/225 |
| 2014/0188825 A1* | 7/2014 | Muthukkaruppan | |
| | | | G06F 16/134 |
| | | | 707/694 |
| 2014/0201488 A1* | 7/2014 | Kirscht | G06F 3/0656 |
| | | | 711/165 |
| 2015/0088827 A1* | 3/2015 | Xu | G06F 3/0605 |
| | | | 707/634 |
| 2017/0134266 A1 | 5/2017 | Venkata et al. | |

* cited by examiner

METHOD AND SYSTEM FOR MANAGING WORKLOADS IN A CLUSTER

CROSS-REFERENCE TO RELATED APPLICATIONS

This application is a continuation application of U.S. patent application Ser. No. 14/043,358, filed on Oct. 1, 2013 and entitled: "Method and System for Managing Switch Workloads in a Cluster." Accordingly, this application claims benefit of U.S. patent application Ser. No. 14/043,358 under 35 U.S.C. § 120. U.S. patent application Ser. No. 14/043,358 is here by incorporated by reference in its entirety.

BACKGROUND

Companies are turning to parallel processing systems in order to efficiently process large amounts of data. One such parallel processing system is Hadoop. In order to maximize the data processing on a parallel processing system, administrators focus on balancing workload among the various servers. The administrator and/or a process executing use current workload on the servers to determine how to distribute future workload on the servers.

SUMMARY

In general, embodiments of the invention relate to a switch. The switch comprises a processor, a plurality of ports, memory comprising instructions, which when executed by the processor perform a method, the method comprising obtaining, via a first port of the plurality of ports, a global task-server mapping from a first server, detecting that one of the plurality of ports is congested, based on the detecting: identifying a task associated with the one of the plurality of ports using the global-task server mapping, generating a task listing based on the identifying, generating an alert comprising the task listing, and transmitting the alert to an administrator.

In general, in one aspect, the invention relates to a switch, comprising: a processor, a plurality of ports, memory comprising instructions, which when executed by the processor perform a method, the method comprising: obtaining local switch load information, wherein the local switch load information specifies bandwidth utilization of the switch, and transmitting the local switch load information to a server.

In general, in one aspect, the invention relates to a switch, comprising a processor, a plurality of ports, memory comprising instructions, which when executed by the processor perform a method, the method comprising: detecting that a link to a first server is down, wherein the first server is directly connected to a port of the plurality of ports on the switch, generating, based on the detecting, a link down message specifying that the link to the first server is down, and transmitting, via one of the plurality of ports, the link down message to the second server, wherein the link down message is sent to the second server prior to a time that the second server expected to receive a heartbeat message from the first server.

In general, in one aspect, the invention relates to a switch, comprising a processor, a plurality of ports, memory comprising instructions, which when executed by the processor perform a method, the method comprising: obtaining a first set of task executing in a cluster, obtaining a first list of servers in the cluster, determining which servers on the first list of servers is the cluster are directly connected to the switch to obtain a second list of servers, querying each server specified in the second list of servers to which of tasks are executing on the second list of servers to obtain a second set of tasks, generating a local task-server mapping using the second list of servers, the first set of tasks and the second set of tasks, wherein only tasks that are present in both the first set of tasks and the second set of tasks are used to generate the local task-server mappings, and annotating an alert message using the local task-server mappings.

Other aspects of the invention will be apparent from the following description and the appended claims.

DETAILED DESCRIPTION

Figure 1:
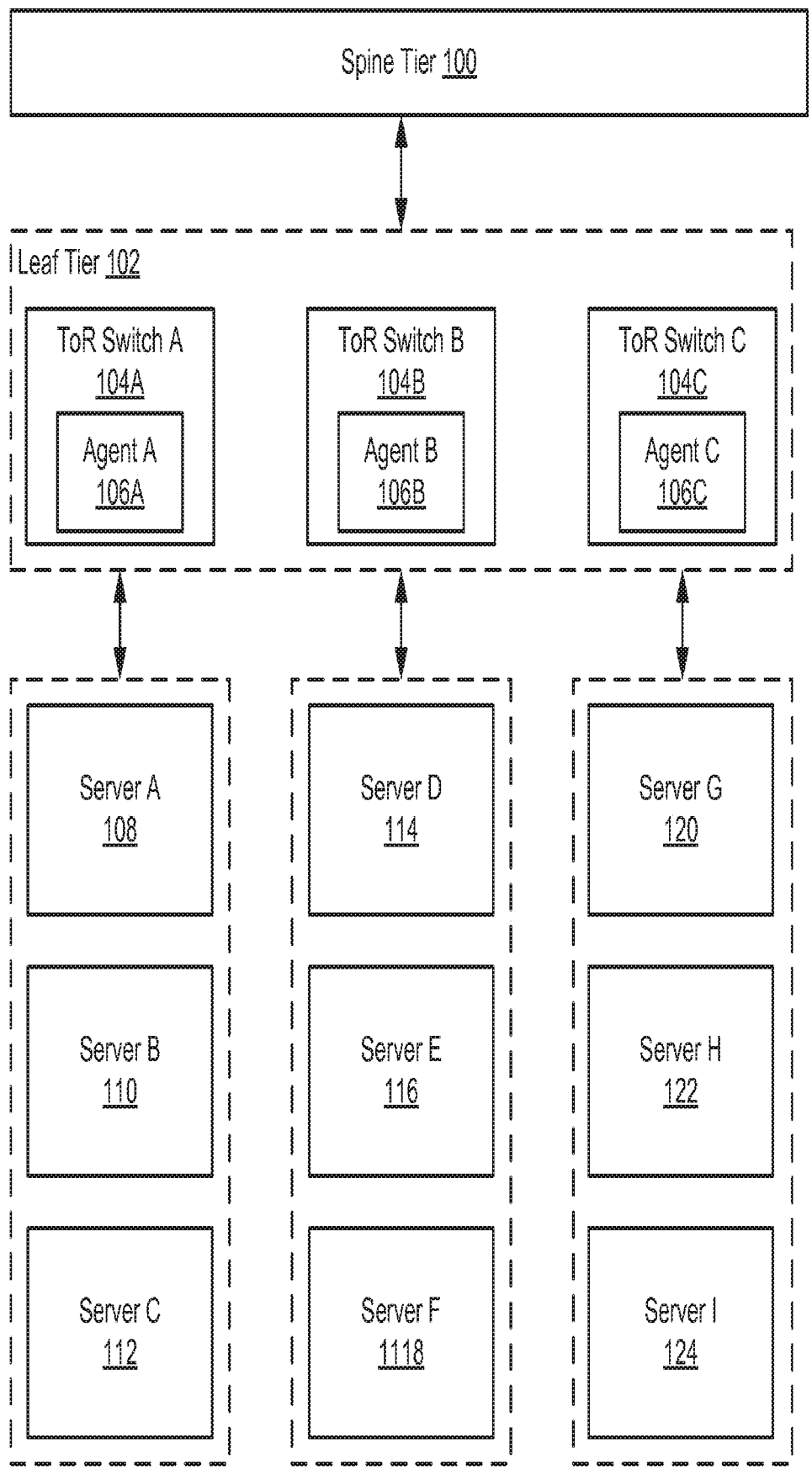
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to using load information for switches in a switch fabric to determine how to balance various types of processing within a cluster that utilizes the switch fabric for communication. More specifically, the load information for the switches in the switch fabric may be used, at least in part, to balance data storage and/or task allocation in the cluster. Further, the load information for the switches in the switch fabric may be used, at least in part, to determine how to most efficiently replicate data in the cluster.

In particular, embodiments of the invention relate to a method and system for balancing workloads in a cluster, where the balancing of the workloads takes into account the current load on various portions of the switch fabric that connects the various servers in the cluster. Further, in one or more embodiments of the invention, the switches in the switch fabric obtain the global task-server mapping, which specifies what tasks are executing on each server in the cluster. In one embodiment, the switches in the switch fabric are configured to obtain information from one or more servers in the cluster in order to derive the global task-server mapping (or a portion thereof). The switches may use this information to annotate alerts in the switches in order to provide administrators with insight into why a given alert was triggered on a given switch.

The following text describes the invention within the context of an Apache Hadoop® (hereafter, a Hadoop system). However, those skilled in the art will appreciate that the invention is not limited to Hadoop; rather, embodiments of the invention may be implemented with other parallel processing systems without departing from the invention. For example, embodiments of the invention may be implemented on any distributed storage system (e.g., Ceph), any distributed compute system (e.g., YARN, Gearman, Sidekiq, etc.) and/or any distributed database system (e.g., HBase, Cassandra, etc.). Further, embodiments of the invention may be implemented on parallel processing systems that implements centralized management (e.g., Hadoop) or implements distributed management (e.g., Cassandra).

Turning to FIG. 1 shows a system in accordance with one or more embodiments of the invention. The system includes one or more servers (108-124), a leaf tier (102), and a spine tier (100). The leaf tier and the spine tier may be collectively referred to as the Switch Fabric. Further, all of the aforementioned components may be co-located in the same physical location. Alternatively, the aforementioned components may not all be co-located. Additional details regarding each of the aforementioned components are provided below.

In one embodiment of the invention, a server (108-124) is a computer system. A computer system may include any type of system that includes at least a processor, memory, and one or more network interfaces and is configured to perform at least the functionality described in FIGS. 2A, 2B, 3, 4, and/or 5. The computer system may also include functionality to execute one or more virtual machines, where each virtual machine may be configured to perform at least the functionality described in FIGS. 2A, 2B, 3, 4, and/or 5. In one embodiment of the invention, each virtual machine corresponds to an execution environment that is distinct from the execution environment provided by the computer system upon which it is executing. Examples of virtual machines include, but are not limited to, Oracle® VM and VMware® Virtual Server. (Oracle is a registered trademark of Oracle International Corporation and VMware is a registered trademark of VMware, Inc.).

Each server is directly connected to at least one Top of Rack (ToR) switch (also referred to as a leaf switch) (104A-104C) in the leaf tier (102). In one embodiment of the invention, each server is only directly connected to a single ToR switch in the leaf tier (102). In one embodiment of the invention, the ToR switches in leaf tier (102) are not directly connected to each other. Alternatively, if the ToR switches implement Multichassis Link Aggregation (MLAG), then a given ToR switch may be directly connected to one other ToR switch in the leaf tier and a given server may be connected to each of the ToR switches in the WAG domain. Each of the ToR switches includes an agent (106A-106C) that is configured to perform at least the functionality described with respect to FIGS. 2C and 6. The agent (106A-106C) may be implemented in software, hardware, or any combination thereof.

Each ToR switch in the leaf tier (102) is connected to at least one spine switch (not shown) in the spine tier (100). In one embodiment of the invention, each ToR switch is connected to every other switch in the spine tier (commonly referred to as Clos network). Further, in one embodiment of the invention, the spine switches in the spine tier (100) are not directly connected to each other. Alternatively, if the spine switches implement Multichassis Link Aggregation (MLAG), then a given spine switch may be directly connected to one other spine switch in the spine tier.

In one embodiment of the invention, each leaf switch and each spine switch is a physical device that includes persistent storage, memory (e.g., Random Access Memory), one or more processing components (e.g., a processor, an Application-specific integrated circuit (ASIC), an integrated circuit, or any other component that enables the switch to perform the functions described below), and two or more physical ports, Each port may be connected to either: (i) a computer system (described above), or (ii) a network device (i.e., any device that is part of the network infrastructure such as a leaf switch, a spine switch or a router).

In another embodiment of the invention, the leaf switch is configured to receive packets from various servers and forward the received packets to a spine switch and (ii) receive packets from the spine switch and forward the received packets to the appropriate servers. In such embodiments the spine switch implements the functionality of the leaf switch (as described below). As such, the leaf switch may be implemented without a processor or memory—instead, the leaf switch may take the form of an optical component that provides the physical connection between the spine switch and the servers.

Continuing with the discussion of FIG. 1, in one embodiment of the invention, each switch (leaf switch or spine switch) is configured to receive packets via the ports and determine whether to (i) drop the packet or (ii) send the packet out over another one of the ports on the switch. How the switch makes the determination of whether to drop or send the packet depends on whether the switch is a layer-2 (L2) switch or a layer-3 (L3) switch (also referred to as multilayer switch). If the switch is operating as a L2 switch, the switch uses the destination media access control (MAC) address in the received packet along with a forwarding table to determine out of which port to send the packet. If the switch is operating as a L3 switch, the switch uses the destination internee protocol (IP) address in the received packet along with a routing table to determine out of which port to send the packet. Those skilled in the art will appreciate that if the leaf switch is configured to receive packets from various servers and forward the received packets to a spine switch and (ii) receive packets from the spine switch and forward the received packets to the appropriate servers, as described above, them the leaf switch may not include functionality to process packets using IP and/or MAC addresses as described above.

In one embodiment of the invention, two or more of the servers (108-124) may be grouped together to form a cluster. In such cases, each cluster includes a single NameNode server (or two NameNode servers if the NameNode servers are part of a high availability pair) and one or more DataNode servers. The NameNode servers and DataNode servers are described below in FIGS. 2A and 2B, respectively. A given system, such as the one in FIG. 1, may concurrently implement one or more clusters.

The invention is not limited to the system shown in FIG. 1. While the aforementioned figure describes switches as Ethernet switches, embodiments of the invention may be implemented using Infiniband switches without departing from the invention. In such embodiments, the Infiniband switches process packets in accordance with the Infiniband standard.

Figure 2A:
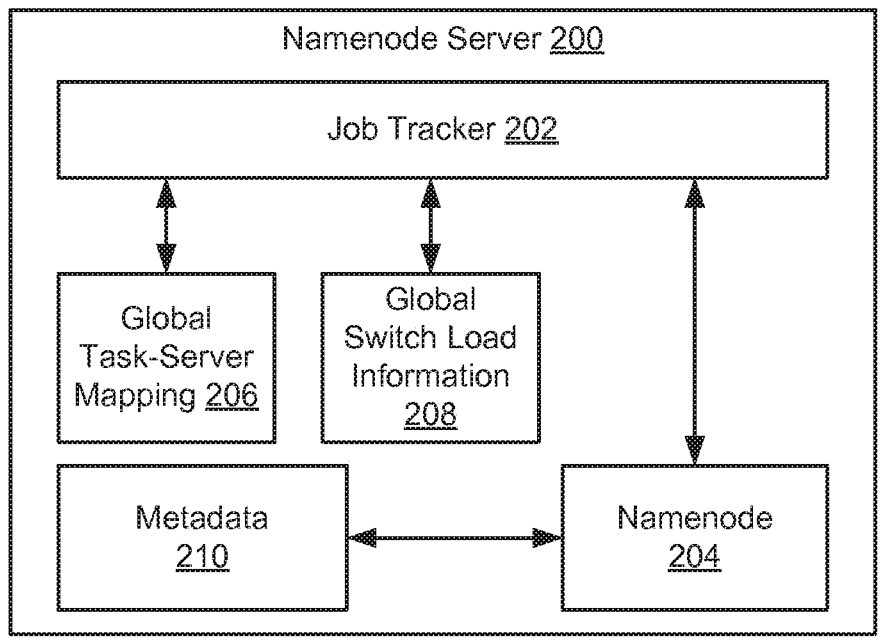
FIG. 2A shows a NameNode server in accordance with one or more embodiments of the invention.

FIG. 2A shows a NameNode server (200) in accordance with one or more embodiments of the invention. In one embodiment of the invention, the NameNode server is a server on which the JobTracker (202) and the NameNode (204) are executing. Each of these components is described below.

In one embodiment of the invention, the NameNode (204) maintains a directory tree of all files in the cluster with which it is associated. In addition, the NameNode tracks the location of all files (or portions thereof) in the DataNode servers in the cluster. This information is stored as metadata (210) on the NameNode server. The NameNode may implement the aforementioned functionality using a distributed file system. In addition to the above functionality, the NameNode also includes functionality to perform the methods shown in FIGS. 4 and/or 5.

Figure 2B:
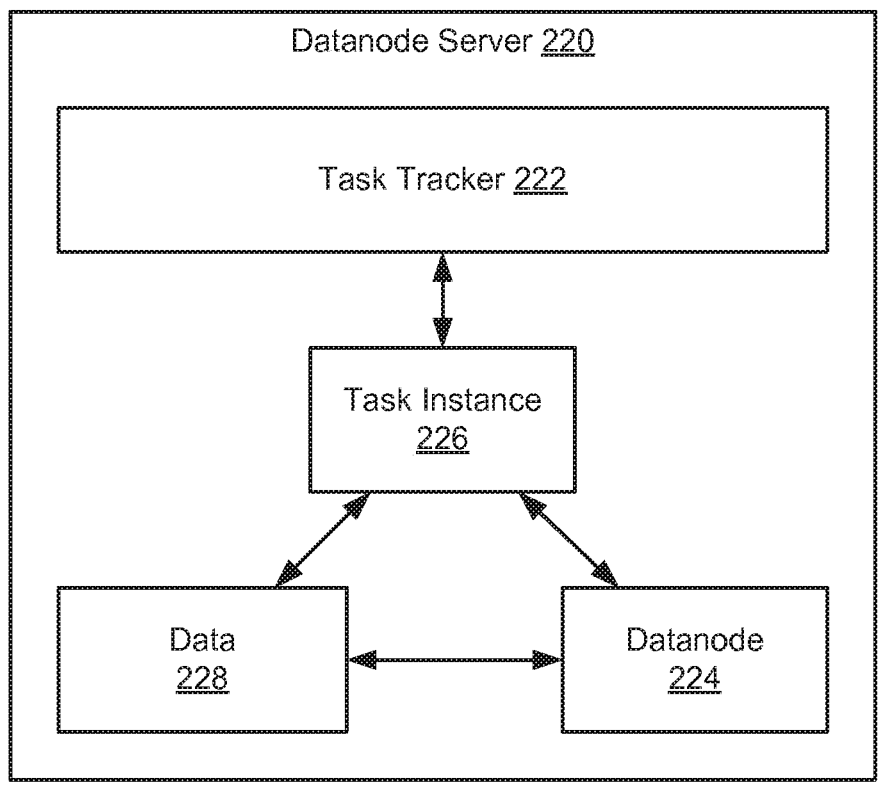
FIG. 2B shows a DataNode server in accordance with one or more embodiments of the invention.

In one embodiment of the invention, the JobTracker (202) includes functionality to distribute tasks to DataNode servers (see FIG. 2B). In one embodiment, a task is a set of work to be performed by a DataNode server. The JobTracker may track which tasks have been issued to which server in the cluster and/or which tasks are currently executing on servers in the cluster. This information may be maintained in global task-server mapping (206), which is periodically updated by the JobTracker (or another process executing on the NameNode server) or by another process executing on another server in the cluster. In one embodiment of the invention, the JobTracker is configured to: (i) receive a job from a client wherein the job specifies a set of tasks to be performed; (ii) interact with the NameNode to determine the location of the files that are required to perform the tasks; and (iii) select a server to perform each of the tasks using, at least in part, the global switch load information (208) as described in FIG. 3.

In one embodiment of the invention, the global switch load information (208) includes the current bandwidth utilization of each switch in the switch fabric (i.e., the amount of data and/or number of packets each switch is transmitting and/or receiving). For example, the current bandwidth utilization may be the number of packets a switch transmitted within the last minute (or another unit of time), the number of bytes a switch received in the last minute (or another unit of time and/or percentage bandwidth utilization. The current bandwidth utilization and other information related to the operation of the individual switches may be determined by the agents (e.g., 242 in FIG. 2C) on the switches. The agents may subsequently provide this information to the NameNode server. The aforementioned information may be provided periodically and/or when the NameNode server requests such information from the switches. The NameNode server aggregates information from the individual switches to generate the global switch load information.

In one embodiment of the invention, the current bandwidth utilization of a given switch may reflect (i) the bandwidth utilization that is associated with a single cluster or (ii) bandwidth utilization that is associated with multiple clusters. For example, if a given switch is connected to server A and server B, where server A is associated with cluster A and server B is associated with cluster B, then the bandwidth utilization of the switch that is provided to the NameNode server in cluster A may be (i) bandwidth utilization of the switch only with respect to tasks executing on server A or (ii) aggregate bandwidth utilization of the switch with respect to tasks executing on server A and tasks executing on server B.

The global switch load information may also include more granular information about the load on each of the individual switches. For example, the global switch load information may include: (i) the portion of the switch bandwidth utilized by each task executing on a DataNode server directly connected to the switch; (ii) the portion of the switch bandwidth utilized by each DataNode server directly connected to the switch; and/or the (iii) the portion of the switch bandwidth utilized for tasks and the portion of switch bandwidth utilized used by the DataNode. The global switch load information may also include, for example, the number of packets dropped on each port and/or the amount of data and/or packets that are stored in buffers associated with the ports (described below). The global switch load information may include other and/or different information without departing from the invention.

FIG. 2B shows a DataNode server in accordance with one or more embodiments of the invention. The DataNode server includes a task tracker (222) and a DataNode (224). Each of these components is described below. The DataNode is part of the distributed file system. The DataNode is configured to service file system requests (e.g., read request, write request, etc.) for data (228) that is locally stored on the DataNode server. The file system requests may be received from the task instance (226) and/or external clients.

In one embodiment of the invention, the task tracker (222) is configured to receive tasks from the JobTracker. Upon receipt of the task, the task tracker instantiates a task instance (226) (e.g., instantiates a virtual machine), where the task instance is configured to execute the task. The task instance may interface with the DataNode and the data in order to complete the task. The task tracker is also configured to periodically send heartbeat messages to the JobTracker, where the heartbeat messages are used by the JobTracker to confirm that the task tracker is reachable by the JobTracker and that it is functioning.

Figure 2C:
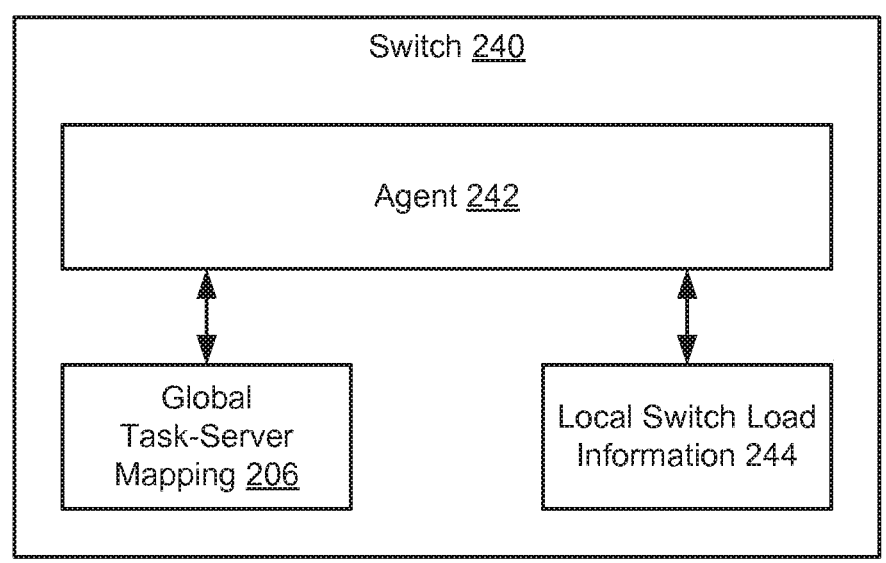
FIG. 2C shows a switch in accordance with one or more embodiments of the invention.

FIG. 2C shows a switch in accordance with one or more embodiments of the invention. In one embodiment of the invention, the switch (240) includes an agent (242), local switch load information (244), and the global task-server mapping (206). The switch (240) includes functionality to process packets as described in FIG. 1. In addition, the switch is configured to determine whether any ports on the switch are congested. In one embodiment of the invention, each port on the switch is associated with one or more buffers where each of the buffers is configured to store packets that are to be transmitted out of the switch via the port. Each of the aforementioned buffers is associated with a threshold value, which may be defined in terms of packets or bytes (or another unit of data). When the number of packets stored in a buffer exceeds the corresponding threshold value or the number of bytes stored in the buffer exceeds a threshold value, the port with which the buffer is associated is deemed to be congested.

The agent (242), which executes on the switch (240), is configured to (i) monitor the ports on the switch to determine if they are congested and (ii) perform the functionality described FIG. 6 using the global task-server mapping (206) (or the local task-server mapping described below). In addition, the agent (242) is configured to monitor the activity on the switch in order to generate local switch load information (244).

The local switch load information (244) includes information about the current bandwidth utilization of the switch (i.e., the amount of data and/or number of packets the switch is transmitting and/or receiving). For example, the current bandwidth utilization may be the number of packets the switch transmitted within the last minute or the number of bytes that the switch received in the last minute. The local switch load information may also include more granular information about the load on the switch. For example, the local switch load information may include: (i) the portion of the switch bandwidth utilized by each task executing on a DataNode server directly connected to the switch; (ii) the portion of the switch bandwidth utilized by each DataNode server directly connected to the switch; and/or the (iii) the portion of the switch bandwidth utilized for tasks and the portion of switch bandwidth utilized used by the DataNode. In one embodiment of the local switch load information may also provide (i) the task associated with each port on the switch, (ii) the current number of packets or bytes stored in a buffer(s) associated with each port (described above). The local switch load information may include other information without departing from the invention. In one embodiment of the invention, the switch (or the agent executing thereon) is also configured to store historical local switch load information.

In one embodiment of the invention, the agent (or another process on the switch) is configured to: (i) obtain the list of tasks (e.g., from the JobTracker) currently executing in the cluster; (ii) obtain a list of servers (e.g., from the JobTracker) that are part of the cluster; (iii) determine which of the servers from the list obtained in (ii) are directly connected to the switch (i.e., local to the switch); (iv) obtain from each of the servers that are local to the switch (as determined in (iii)), the tasks currently executing thereon; (v) generating a local task-server mapping from the switch using the information obtained in and (iv). More specifically, with respect to (v), the local task-server mapping only include task-server mappings for tasks that are present in both the list of tasks obtained in (i) and the tasks identified in (iv). The above process may be repeated periodically by each of the switches.

Figure 3:
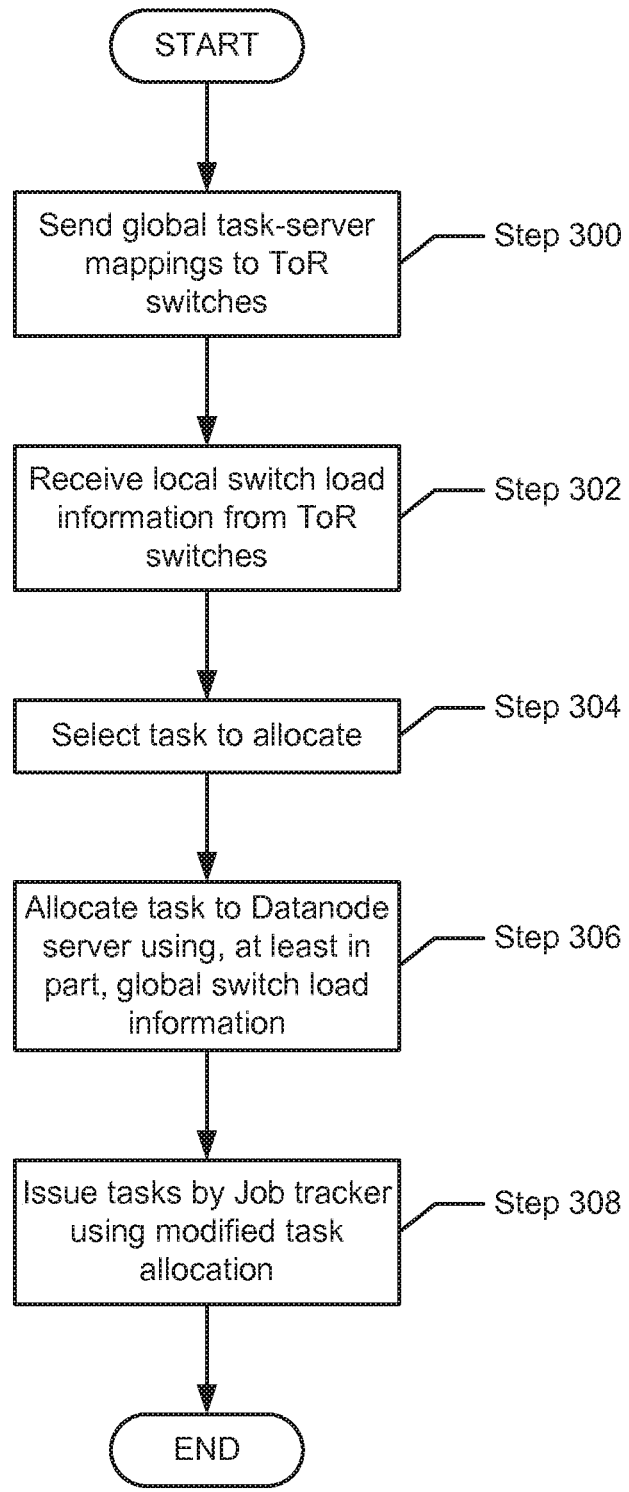
FIG. 3 shows a method for using load information to allocate future tasks in accordance with one or more embodiments of the invention.

FIG. 3 shows a method for using load information to allocate future tasks in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 3 may be performed in parallel with any other steps shown in FIGS. 4-6 without departing from the invention.

In Step 300, the current global task-server mapping for a cluster is obtained by one or more rack (ToR) switches. More specifically, the global task-server mapping is obtained by each ToR switch that is connected to at least one of the servers in the cluster. If the switch is associated with multiple clusters, then the switch may receive a global task-server mapping for each cluster with which it is associated. The global task-server mapping may be transmitted to the various ToR switches using a push mechanism or a pull mechanism. Alternatively, one or more of the ToR switches may (as described above) obtain the necessary information from the JobTracker to generate a corresponding local task-server mapping.

In Step 302, local switch load information is received from one or more ToR switches by the JobTracker executing on a NameNode server in the cluster. More specifically, local switch load information is received from one or more ToR switches associated with the cluster with which the JobTracker is associated. The local switch load information may be transmitted to the NameNode server using a push mechanism or a pull mechanism.

The local switch load information may (i) only include switch load information for the cluster with which the JobTracker is associated or (ii) include switch load information for all clusters with which the switch is associated. In scenario (ii), the portion of local switch load information for the cluster with which the JobTracker is associated may be provided in a very granular form while the portion of the local switch load information for the cluster with which the JobTracker is not associated may only be provided in a form that does not enable the JobTracker to view any task level details for tasks issued by a JobTracker in another cluster. For example, the local switch load information sent to a JobTracker in cluster A may include the following information: (i) Cluster A—Task 1—100 MB/s, (ii) Cluster A—Task 2—25 MB/s; (iii) Cluster A—Task 3—150 MB/s; and (iv) Cluster B—80 MB/s.

Continuing with the discussion of step 302, the local switch load information received from the switches may be aggregated to obtain global switch load information.

In Step 304, the JobTracker (or another process) selects a task to allocate to a server in the cluster. In step 306, the task is allocated to a DataNode server using, at least in part, the global switch load information. More specifically, the JobTracker analyzes the global switch load information to identify a DataNode server in the cluster that is directly connected to a switch that currently has a light load relative to other switches that are receiving and/or transmitting data for the cluster. Said another way, JobTracker identifies, using at least in part the global switch load information, that a given switch has a high load and as a result does not issue tasks to DataNode servers directly connected to this switch and instead allocates the task to a DataNode server in the cluster that is directly connected to another switch that has a lower relative load. In Step 308, the JobTracker subsequently issues the task to the DataNode server identified in step 306.

In one embodiment of the invention, steps 300 and 302 are performed periodically. While steps 306-308 are performed whenever a task needs to the allocated to a DataNode server.

Figure 7A:
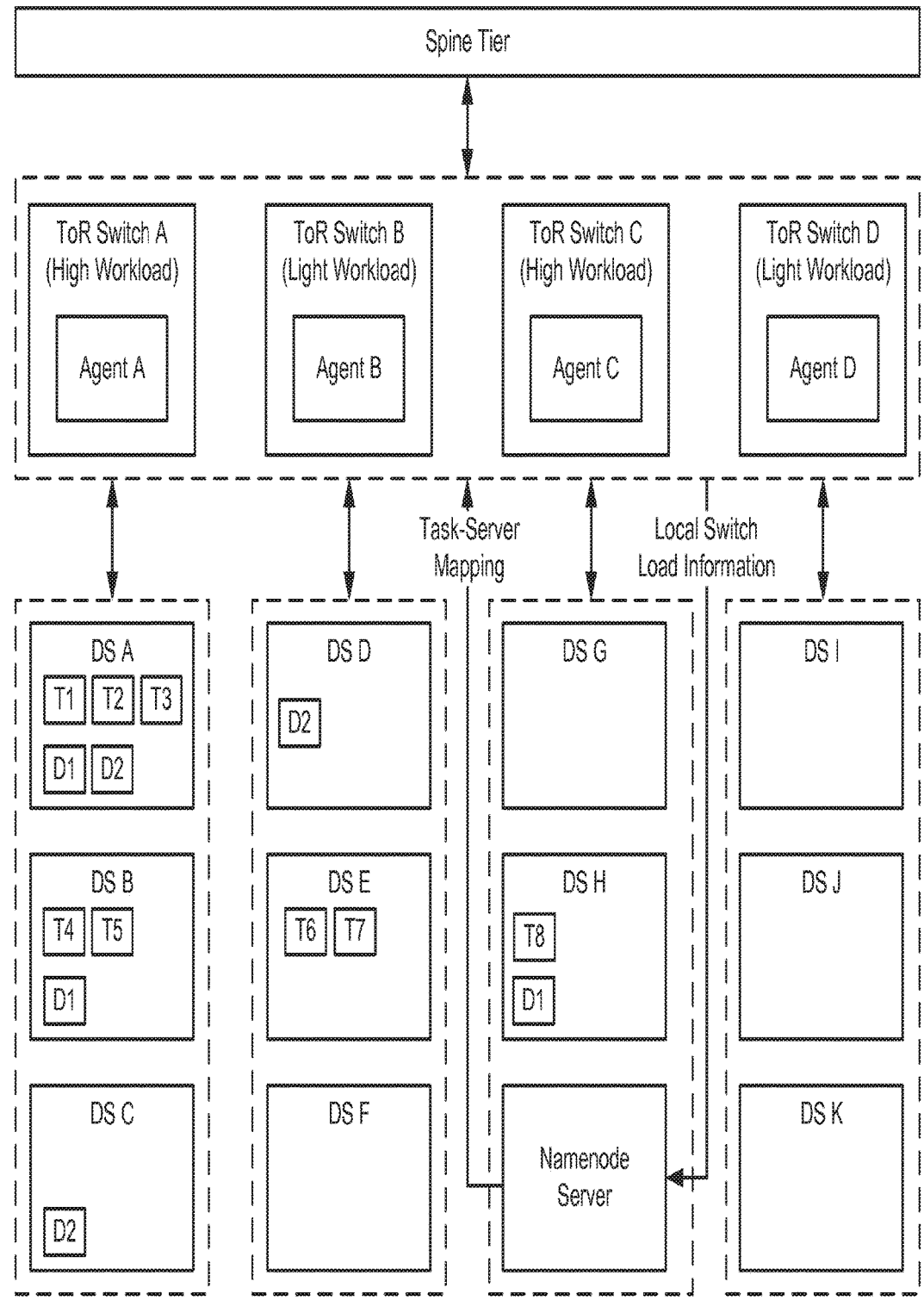
FIGS. 7A-7C show various examples in accordance with one or more embodiments of the invention.
Figure 7B:
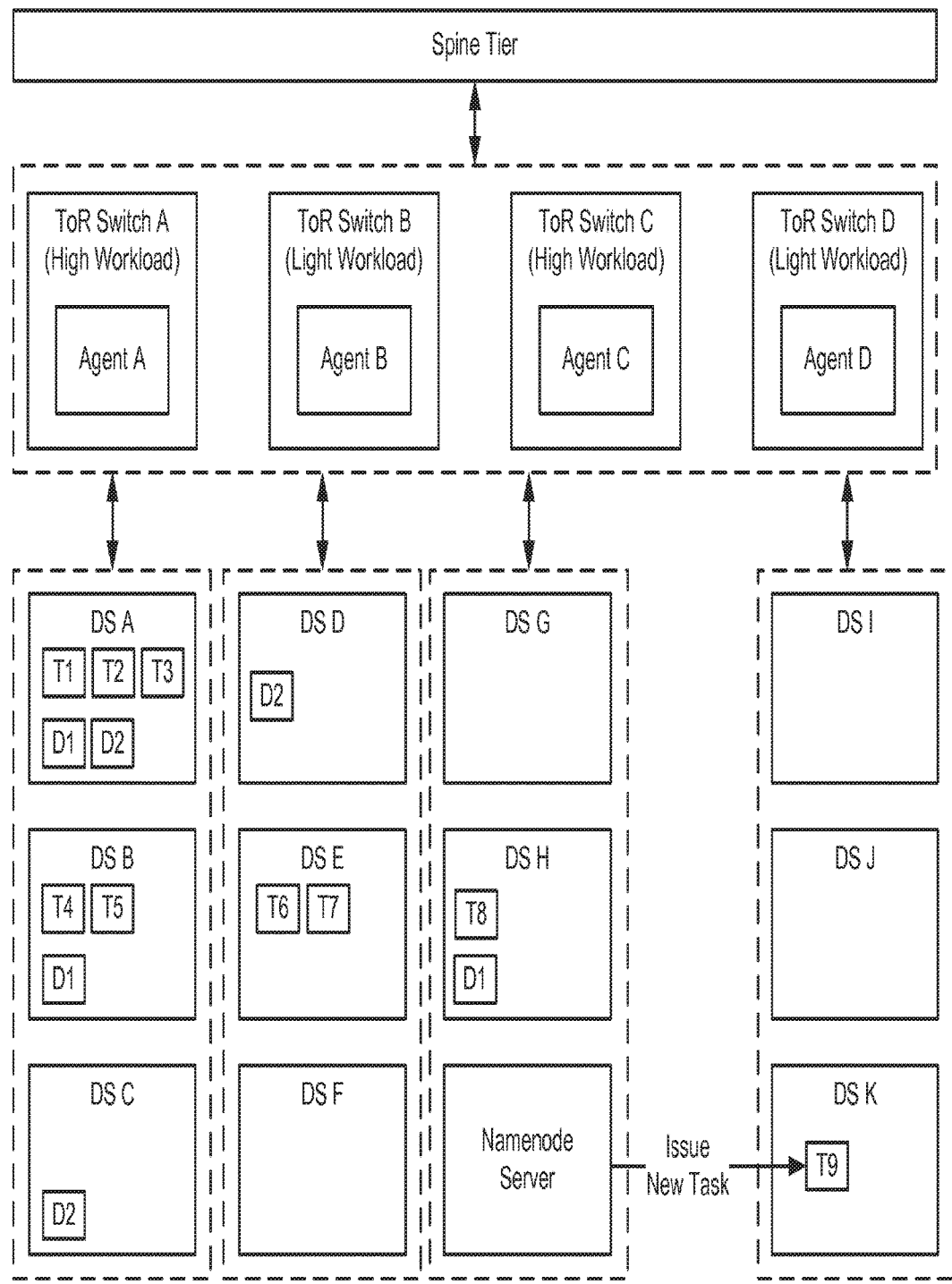

While FIG. 3 has been described as being performed by the JobTracker, one or more steps of the aforementioned method may be performed by another process on the NameNode server without departing from the invention. Further, an example of the method described in FIG. 3 is shown in FIGS. 7A-7B.

Figure 4:
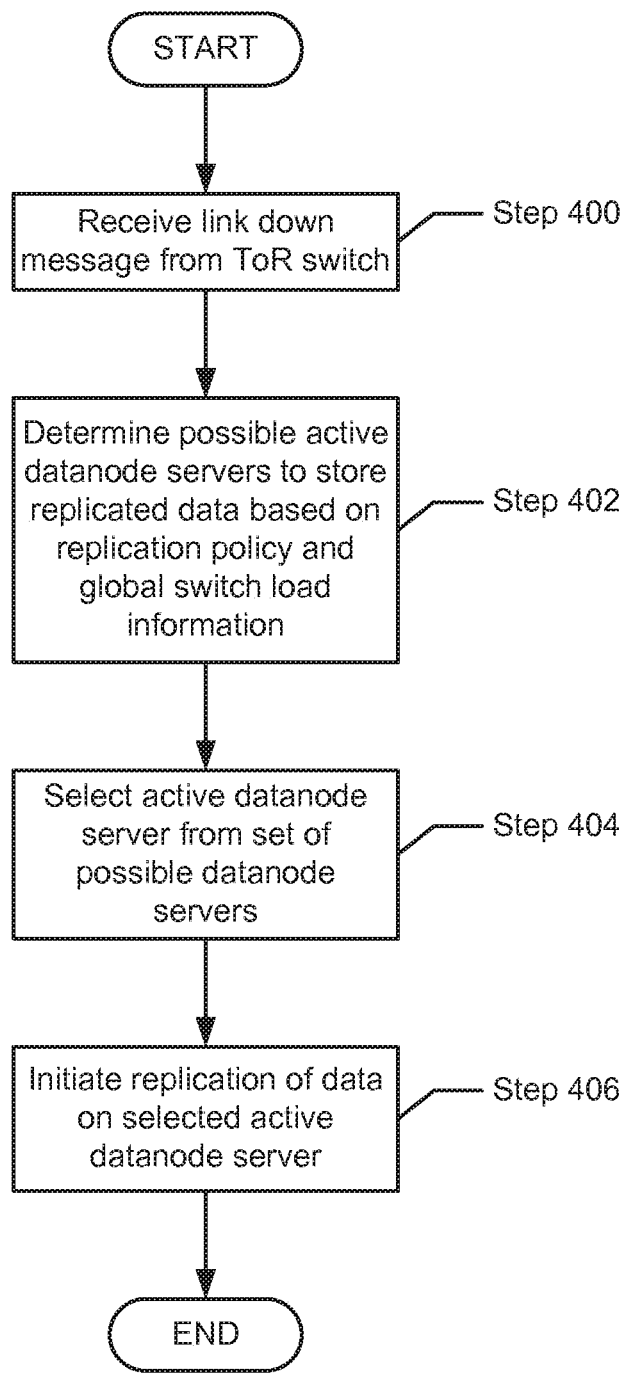
FIG. 4 shows a method performed by the NameNode when a link to a DataNode server goes down in accordance with one or more embodiments of the invention.

FIG. 4 shows a method performed by the NameNode when a link to a DataNode server goes down in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 4 may be performed in parallel with any other steps shown in FIGS. 3 and 5-6 without departing from the invention.

In Step 400, a link down message is received by the NameNode server from a ToR switch. In one embodiment of the invention, the link down message specifies that a given server is no longer accessible via the ToR switch to which it is directly connected. Said another way, the ToR switch (or the agent executing thereon) monitors the link status for all ports on the ToR switch. When a link to a server goes down (i.e., packets can not be sent or received on the port to which the server is directly connected), the agent (or another process executing on the ToR switch) generates and sends a link down message to the NameNode server.

The receipt of the link down message by the NameNode server triggers initiation of the replication service. More specifically, in one embodiment of the invention, the distributed file system requires that there are multiple redundant copies of each piece of data stored in the distributed file system. As such, when a link to a server goes down, the data stored on that server is no longer accessible to the distributed file system, thereby necessitating the initiation of the replication service in order to store additional copies of the data on servers in the cluster on which the link is active (i.e., the link is not down). Once the replication service has been initiated, the process proceeds to step 402.

In Step 402, the replication service (which may be implemented by the NameNode) determines all possible DataNode servers that may be used to store replicated data based on the replication policy and the global switch load information. More specifically, the replication policy specifies the number of replicated copies for each piece of data and the relative location for each of the replicated copies within the cluster. For example, the replication policy may indicate that there are three copies of each piece of data and that two copies of the data should be stored in the same rack but on different DataNode servers and that a third copy of the data should be stored on a DataNode server in a separate rack. The replication policy may take into account other factors without departing from the invention.

In one embodiment of the invention, the identification of all possible DataNode servers takes into account where the replication policy require that copies of the data to be stored in the cluster and also takes into account the load of the switches that are receiving and transmitting data for the cluster. For example, using only the replication policy, five DataNode servers may be identified as possible locations to store the new copies of the replicated data. However, once the global switch load information is taken into account, only three of the five DataNode servers are deemed to be possible locations for the new copies of the replicated data as the other two previously identified DataNode servers are directly connected to switches that are currently experiencing a high load (in absolute or relative terms).

In Step 404, once the set of possible DataNode servers is identified in step 402, one or more DataNode servers are selected to store the new copies of the replicated data. The selection of the particular DataNode servers in step 402 may be based on, for example, (i) a random selection; (ii) selected based the current load of the ToR switch to which a particular DataNode server is connected, where the lower the load on the switch the more likely the DataNode server is to be selected; (iii) any other selection mechanism; or (iv) any combination thereof.

Figure 7C:
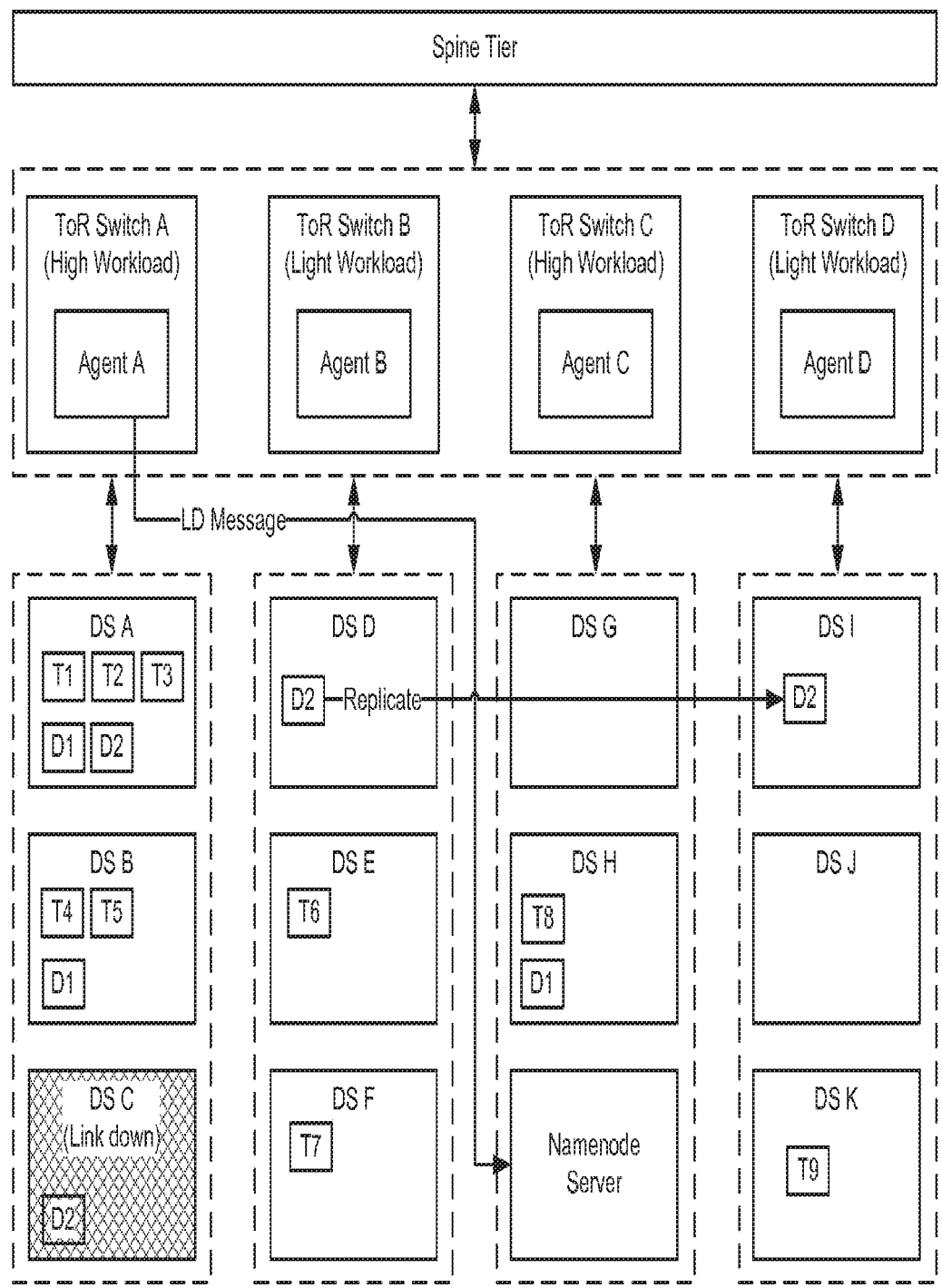

In Step 406, the replication is initiated where the new copy(ies) of the replicated data are stored on the DataNode server(s) selected in Step 404. In one embodiment of the invention, the global load switch information may also be used to identify the DataNode server (also referred to as the "source DataNode server") that is generating the new copy of the data and transmitting it to the DataNode server(s) identified in Step 404. In one embodiment of the invention, if there are multiple potential source DataNode servers, then the source DataNode server for use in the replication could be the DataNode server that is directly connected to the ToR switch with the lowest (actual or relative) load. An example of the method described in FIG. 4 is shown in FIG. 7C.

Figure 5:
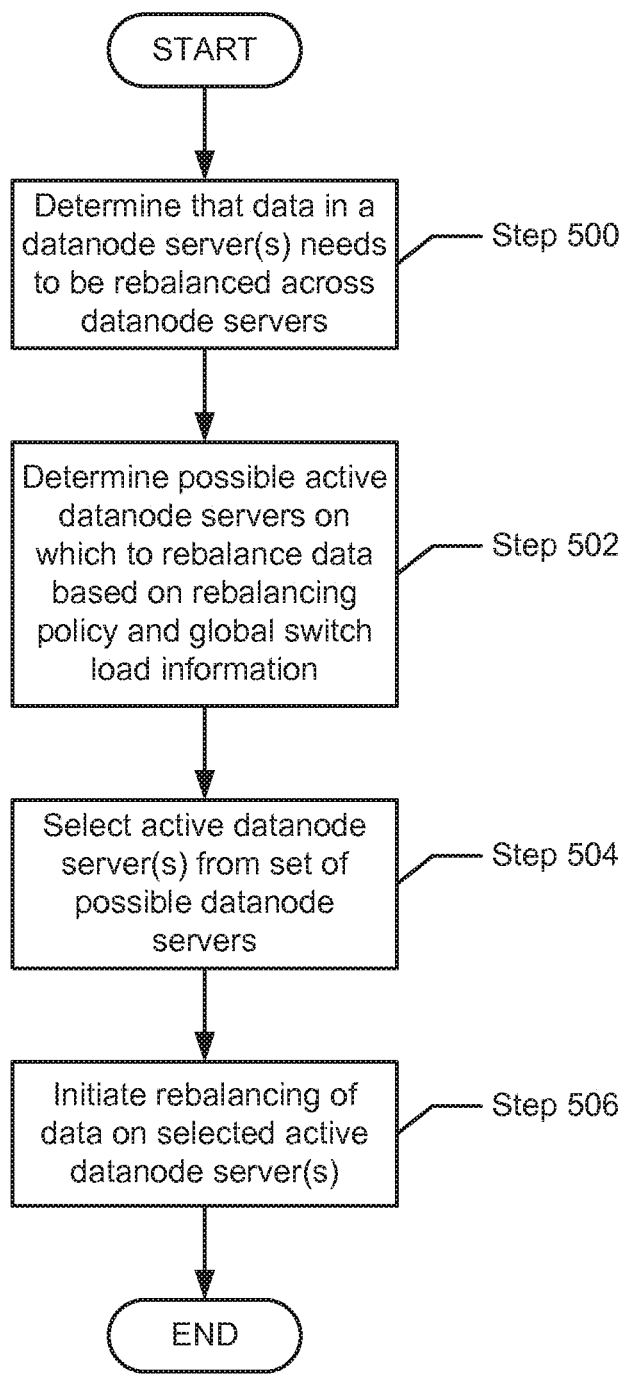
FIG. 5 shows a method performed by the NameNode for rebalancing data in DataNode servers in accordance with one or more embodiments of the invention.

FIG. 5 shows a method performed by the NameNode for rebalancing data in DataNode servers in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 5 may be performed in parallel with any other steps shown in FIGS. 3-4 and 6 without departing from the invention.

In Step 500, a determination is made about whether data in a DataNode server(s) needs to be rebalanced across other DataNode servers in the cluster. More specifically, in one embodiment of the invention, if (i) the amount of data stored in a given DataNode server in the cluster is disproportionate with respect to the amount of data stored in other DataNode servers in the cluster or (ii) the amount of data stored in a given DataNode server in the cluster exceeds a threshold, then data stored on the DataNode server(s) needs to be migrated to another DataNode server(s) in the cluster. Based on the determination is step 500, a rebalancing service on the NameNode server is initiated. Once the rebalancing service is initiated, the process proceeds to step 502.

In Step 502, the rebalancing service (which may be implemented by the NameNode) determines all possible DataNode servers that may be used to store data based on the rebalancing policy and the global switch load information. More specifically, the rebalancing policy specifies the maximum amount of data that may be currently stored on a DataNode server in order for the DataNode server to be eligible to store data as part of the rebalancing process. The rebalancing policy may take into account other factors without departing from the invention. In one embodiment of the invention, the identification of all possible DataNode servers takes into account which DataNode servers are eligible to participate in the rebalancing process and also takes into account the load of the switches that are receiving and transmitting data for the cluster. For example, using only the rebalancing policy, five DataNode servers may be identified as possible locations to store the rebalanced data. However, once the global switch load information is taken into account, only three of the five DataNode servers are deemed to be possible locations for the new copies of the replicated data as the other two previously identified DataNode servers are directly connected to switches that are currently experiencing a high load (in absolute or relative terms).

In Step 504, once the set of possible DataNode servers is identified in step 502, one or more DataNode servers are selected to store the new copies of the rebalanced data. The selection of the particular DataNode servers in step 502 may be based on, for example, (i) a random selection; (ii) selected based the current load of the ToR switch to which a particular DataNode server is connected, where the lower the load on the switch the more likely the DataNode server is to be selected; (iii) any other selection mechanism; or (iv) any combination thereof. In Step 506, the rebalancing is initiated where the rebalanced data is stored on the DataNode server(s) selected in Step 504.

Figure 6:
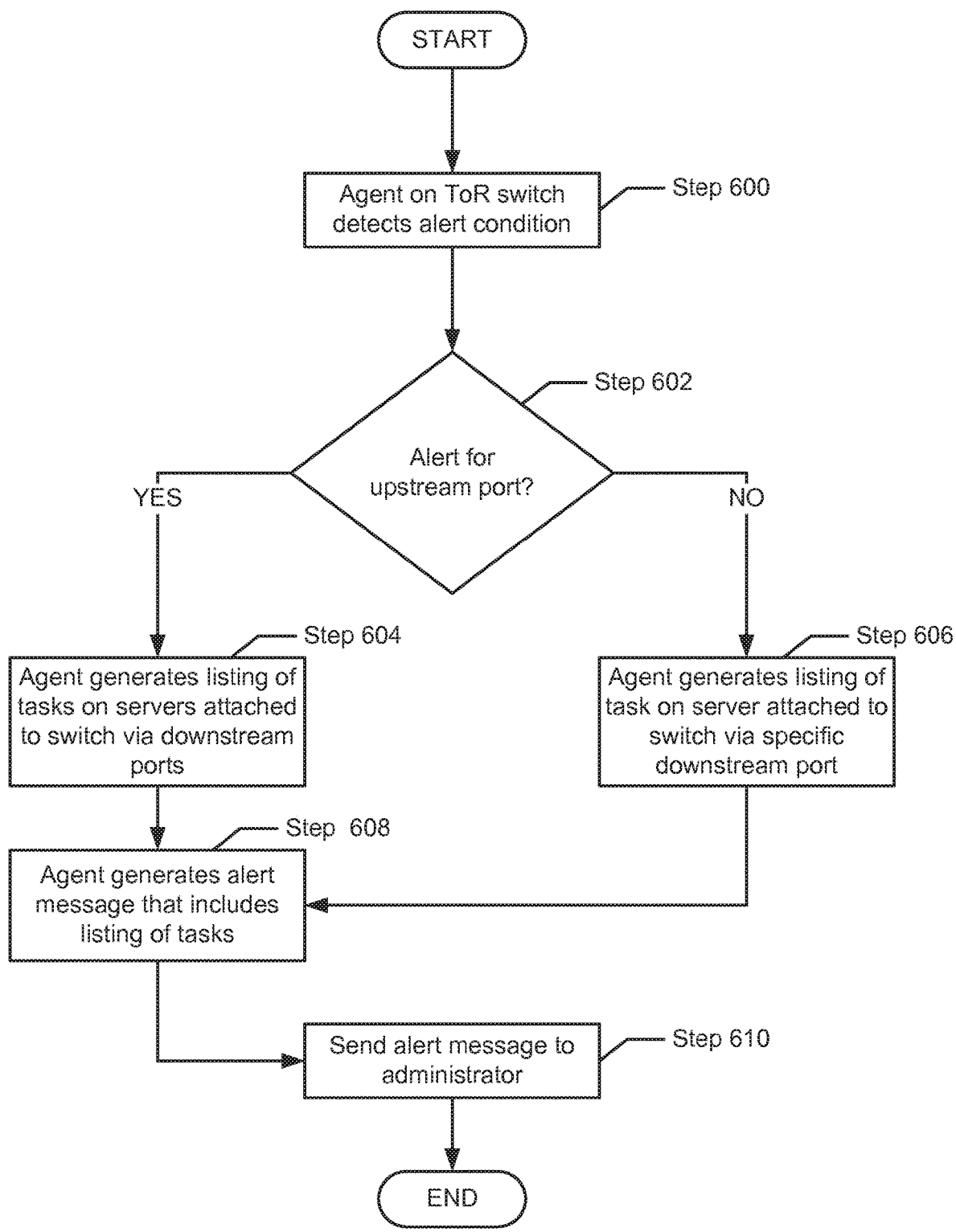
FIG. 6 shows a method performed by the switch for issuing an alert in accordance with one or more embodiments of the invention.

FIG. 6 shows a method performed by the switch for issuing an alert in accordance with one or more embodiments invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIG. 6 may be performed in parallel with any other steps shown in FIGS. 3-5 without departing from the invention.

In Step 600, an agent on the ToR switch detects an alert condition. In one embodiment of the invention, the alert condition may correspond: to the detection of congestion on a port (as described above), to a determination that a given port operating improperly, and/or to a determination that some other event has occurred with respect to a port on the switch, where the administrator has requested notification of such an event.

In Step 602, a determination is made about whether the port with which the alert condition is associated is an upstream port or a downstream port. A port is denoted as an upstream port when it is directly connected to another switch, e.g., a port of a leaf switch is directly connected to a port on the spine switch. A port is denoted as a downstream port when the port is directly connected to a DataNode server or a NameNode server. If the port with which the alert condition is associated is an upstream port, the process proceeds to step 604; otherwise the process proceeds to step 606.

In Step 604, the agent generates a listing of tasks associated with the servers directly connected to the switch on which the agent is executing. The aforementioned list may be generated using the global task-server mapping received from the NameNode server. Alternatively, the listing of tasks may be generated using the local task-server mapping on the switch. The agent may use the local switch load information, for example, to order the tasks on the aforementioned list in order of bandwidth utilization by task or bytes transmitted per task at the time the alert condition was detected.

As discussed above, if the alert condition is associated with a downstream port, then the process proceeds to Step 606. In step 606, the agent generates a listing of tasks associated only with the server directly connected to port with which the alert is associated. The aforementioned list may be generated using the global task-server mapping received from the NameNode server. Alternatively, the listing of tasks may be generated using the local task-server mapping on the switch. In addition, the agent may use the local switch load information, for example, to order the tasks on the aforementioned list in order of bandwidth utilization by task or bytes transmitted per task at the time the alert condition was detected.

In Step 608, the agent generates an alert message, which includes the listing of tasks (generated in either step 604 or step 606) as well as information about the port that triggered the alert (e.g., information about how may packets or bytes are in the buffer(s) associated with the port, etc). In one embodiment of the invention, alert message may also include historical information about the load on the switch. The process then proceeds to Step 610. In Step 610, the alert message (generated in step 608) is transmitted (e.g., via an email, SMS, or a message in another format) to the administrator. A copy of the alert message may also be stored in the switch. In another embodiment of the invention, the alert message (or at least the listing of tasks) is streamed to an external system such as an external monitoring system or a network tap aggregation system. With respect to the network tap aggregation system ("tap system"), when an alert message is received by the tap system, the tap system may initiate the collection of network traffic on the switch from which the alert message was sent. The collected network traffic may be stored for future analysis.

While FIG. 6 describes including a listing of tasks that are executing on servers directly connected to the switch that issued the alert message. The invention is not limited to this embodiment. Specifically, embodiments of the invention include annotating alert message using information that is relevant to the application executing in the cluster. For example, if the cluster is implementing a distributed database, then the alert message may include information per-database-table information.

In one embodiment of the invention, annotation of the alert messages as described in FIG. 6 allows the workload in the cluster to be mapped to the physical topology of the cluster. For example, by specifying which tasks are executing on a server, the agent on the switch is able to map which task as associated with each port on the switch. This information may then be provided to an administrator in order to provide the administrator with insight into how the application on the cluster is utilizing the switch fabric associated with the cluster. Further, the agent may also provide this information (as part of the local switch load information) to the NameNode Server, which may in turn use this information, at least in part, to allocate future tasks, to replicate data, and/or to rebalance data in the cluster.

FIGS. 7A-7C show various examples in accordance with one or more embodiments of the invention. The examples are not intended to limit the invention.

Turning to FIG. 7A, consider a scenario in which there is a cluster that includes 12 servers—one name node server and 11 DataNode servers (DS A-DS K). Further, there are eight tasks (T1-T8) executing on various DataNode servers as shown in FIG. 7A. Finally, data (D1) is replicated three times within the cluster and data (D2) is replicated three times within the cluster. Communication between the servers in the aforementioned cluster is enabled by four ToR switches (ToR Switch A-ToR Switch D) in a leaf tier and a spine tier. Each of the ToR switches includes an agent (Agent A-Agent D).

As shown in FIG. 7A, the NameNode server periodically sends the task-server mapping to all ToR switches. Further, each of the ToR switches periodically sends local switch load information to the NameNode server. As described above, NameNode server may aggregate the local switch load information in order to generate global switch load information. In the example shown in FIG. 7A, the local switch load information indicates that (i) there is a high load on Told switch A and ToR switch C and (ii) there is a low load on ToR switch B and ToR switch D.

Turning to FIG. 7B, assume that the Job Tracker (not shown) executing on the NameNode server analyzes (in accordance with FIG. 3) the global switch load information (as described in FIG. 7A) and determines that there is a need to modify the future allocation of tasks. Specifically, because ToR switch A and ToR switch B have high loads, the Job Tracker determines that new tasks should be allocated to DataNode servers that are directly connected to ToR switch or ToR switch D. Based on the above, a modified task allocation is generated. At some later point in time, the Job Tracker generates task T9 and, based on the modified task allocation, issues that task to DataNode server DS K.

Turning to FIG. 7C, consider a scenario in which a link between ToR Switch A and DataNode server DS C is down. When this occurs, ToR Switch A sends a link down (LD) message to the NameNode server. Because the LD message is sent when the link goes down, there is a minimal delay between the link going down and the NameNode server being notified of this occurrence. In contrast, if the NameNode server had relied only on receiving heartbeat messages from the DataNode server to determine whether a given DataNode server is accessible, then there would be additional delay for the NameNode server to determine that a DataNode server is inaccessible as the NameNode server would have to wait for a period of time after it expected to receive a heartbeat message in order to detect that the DataNode server is inaccessible.

Continuing with the discussion of FIG. 7C, upon receipt of the LD message, the NameNode server performs the method described in FIG. 4. Specifically, assume that the replication policy requires that there are three copies of each piece of data in the cluster. Accordingly, the NameNode server determines all possible DataNode servers that may store the new copy of D2. Taking into account only the aforementioned replication policy, the possible DataNode servers include: DS B, DS E, DS F, and DS G-DS K. However, when the global switch load information is also taken into account, the list of possible DataNode servers reduces to DS E, DS F, DS I, DS J, and DS K. In addition, the global switch load information also indicates that while Switch B has a light workload, the ports connected to DS E and DS F are congested. As a result, the list of possible DataNode servers reduces to DS I, DS J, and DS K. The NameNode server subsequently randomly selects DS I (from the set of DS I, DS J, and DS K) as the DataNode server to store the new copy of D2.

As discussed above, the replication service also has to determine the source DataNode server. In this example, there are two possible source DataNode servers—DS A and DS D; however, because DS A is associated with a ToR Switch that has a high load DS D is selected. At this stage, the replication service initiates the replication of D2 to DS I using DS D as the source DataNode server for D2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    receiving, by a NameNode server, a link down message from a switch, wherein the link down message indicates that a connection to a first DataNode server is disrupted, and wherein the first DataNode server comprises stored data; and
    in response to receiving the link down message:
        identifying, using global switch load information, a plurality of other DataNode servers, wherein the global switch load information specifies bandwidth utilization of a plurality of switches connected to the plurality of other DataNode servers;
        initiating replication of a copy of the stored data to a second DataNode server of the plurality of other DataNode servers based on the global switch load information;
        identifying that a third DataNode server of the plurality of other DataNode servers comprises a disproportionate amount of data relative to remaining DataNode servers of the plurality of other DataNode servers; and
        triggering, based on the identification of the third DataNode server, a data storage rebalancing among the plurality of other DataNode servers based on a rebalancing policy.

2. The method of claim 1, wherein the NameNode server identifies the plurality of other DataNode servers based, at least in part, on a replication policy.

3. The method of claim 2, wherein the replication policy comprises a specification of a quantity of the plurality stored copies.

4. The method of claim 2, wherein the replication policy comprises a specification of a relative location for each of the plurality of stored copies.

5. The method of claim 1, wherein identifying the plurality of other DataNode servers comprises:
    evaluating a current load of the switch connected to the plurality of other DataNode servers.

6. The method of claim 1, wherein the stored data is replicated from a source DataNode server of the plurality of other DataNode servers.

7. The method of claim 6, wherein the source DataNode server is selected based on a direct connection to a second switch having a lowest load.

8. The method of claim 1, wherein the rebalancing policy specifies a maximum amount of data that may be stored on each of the DataNode servers of the plurality of other DataNode servers.

9. The method of claim 1, wherein the rebalancing among the plurality of other DataNode servers comprises:
    identifying a subset of DataNode servers of the plurality of other DataNode servers that are eligible for storing rebalanced data.

10. The method of claim 9, wherein the rebalancing among the plurality of other DataNode servers further comprises:
    selecting, using the global switch load information, a fourth DataNode server of the subset of DataNode servers to store the rebalanced data.

11. A NameNode server, comprising:
    a processor; and
    memory comprising instructions, which when executed by the processor perform a method, the method comprising:
        receiving a link down message from a switch, wherein the link down message indicates that a connection to a first DataNode server is disrupted, and wherein the first DataNode server comprises stored data; and
        in response to receiving the link down message:
            identifying, using global switch load information, a plurality of other DataNode servers, wherein the global switch load information specifies bandwidth utilization of a plurality of switches connected to the plurality of other DataNode servers;
            initiating replication of a copy of the stored data to a second DataNode server of the plurality of other DataNode servers based on the global switch load information;

identifying that a third DataNode server of the plurality of other DataNode servers comprises a disproportionate amount of data relative to remaining DataNode servers of the plurality of other DataNode servers; and triggering, based on the identification of the third DataNode server, a data storage rebalancing among the plurality of other DataNode servers based on a rebalancing policy.

12. The NameNode server of claim 11, wherein the NameNode server identifies the plurality of other DataNode servers based, at least in part, on a replication policy.

13. The NameNode server of claim 12, wherein the replication policy comprises a specification of a quantity of the plurality stored copies.

14. The NameNode server of claim 12, wherein the replication policy comprises a specification of a relative location for each of the plurality of stored copies.

15. The NameNode server of claim 11, wherein identifying the plurality of other DataNode servers comprises:
evaluating a current load of the switch connected to the plurality of other DataNode servers.

16. The NameNode server of claim 11, wherein the stored data is replicated from a source DataNode server of the plurality of other DataNode servers.

17. The NameNode server of claim 16, wherein the source DataNode server is selected based on a direct connection to a second switch having a lowest load.

18. The NameNode server of claim 11, wherein the rebalancing policy specifies a maximum amount of data that may be stored on each of the DataNode servers of the plurality of other DataNode servers.

19. The NameNode server of claim 11, wherein the rebalancing among the plurality of other DataNode servers comprises:
identifying a subset of DataNode servers of the plurality of other DataNode servers that are eligible for storing rebalanced data.

20. The NameNode server of claim 19, wherein the rebalancing among the plurality of other DataNode servers further comprises:
selecting, using the global switch load information, a fourth DataNode server of the subset of DataNode servers to store the rebalanced data.

* * * * *